United States Patent
Ohmura et al.

(12)

(10) Patent No.: US 6,261,718 B1
(45) Date of Patent: Jul. 17, 2001

(54) SURFACE-TREATED STEEL SHEET FOR BATTERY CONTAINER

(75) Inventors: Hitoshi Ohmura; Tatsuo Tomomori; Hideo Ohmura, all of Yamaguchi-ken (JP)

(73) Assignee: Toyo Kohan Co., Ltd., Tokyo (JP)

( * ) Notice: Subject to any disclaimer, the term of this patent is extended or adjusted under 35 U.S.C. 154(b) by 0 days.

(21) Appl. No.: 09/511,900

(22) Filed: Feb. 23, 2000

Related U.S. Application Data

(62) Division of application No. 09/171,978, filed as application No. PCT/JP97/01576 on May 9, 1997, now Pat. No. 6,087,040.

(30) Foreign Application Priority Data

May 9, 1996 (JP) .................................................. 8-137750

(51) Int. Cl.⁷ ............................. H01M 2/02; B32B 15/18
(52) U.S. Cl. ......................... 429/176; 428/679; 429/163
(58) Field of Search ............................ 428/679; 429/176, 429/163

(56) References Cited

U.S. PATENT DOCUMENTS 4,325,994 * 4/1982 Kitashima et al. .

6,126,759 * 10/2000 Hosoya et al. .

FOREIGN PATENT DOCUMENTS

| 53-047939 | 4/1978 | (JP) . |
|---|---|---|
| 2-168554 | 6/1990 | (JP) . |
| 3-216952 | 9/1991 | (JP) . |
| 7-099686 | 10/1995 | (JP) . |
| 720-579 | 3/1980 | (RU) . |

* cited by examiner

Primary Examiner—John S. Maples
(74) Attorney, Agent, or Firm—Browdy and Neimark

(57) ABSTRACT

A battery case which has a high quality and is suitable for continuous forming and a surface-treated steel sheet which can be used suitably for manufacturing the battery case. The battery case is manufactured by forming, by the DI or DTR forming method, a surface-treated steel sheet obtained by plating the external and internal surfaces of an original steel sheet with a nickel-cobalt alloy. The nickel-cobalt alloy plated to both surfaces of the battery case can reduce the punching load in a cupping process, because the powdering property can be reduced remarkably. Therefore, the scratching of a die and a punch caused by metallic contact can be suppressed and the service lives of the die and the punch are prolonged, and then, the continuous productivity of the battery case can be improved. In addition, the case has a good lubricant retaining property, the removing property (stripping property) of the battery case which is an important factor for the DI or DTR formability can be improved.

2 Claims, No Drawings

SURFACE-TREATED STEEL SHEET FOR BATTERY CONTAINER

This is a division of parent application Ser. No. 09/171,978, nationalized Oct. 29, 1998, now U.S. Pat. No. 6,087,040 the international filing date of which is May 9, 1997, as PCT/JP97/01576.

FIELD OF THE INVENTION

The present invention concerns a container where alkaline solution is packed.

More specifically, it concerns a battery exterior container of alkali manganese batteries and the nickel cadmium batteries. Moreover, it concerns the surface treated steel sheet that is suitable for making thereof.

PRIOR ART

A method of barrel plating after press forming cold-rolled steel strip into a battery container or a method of press forming nickel-plated steel strip into a battery container have been adopted for manufacturing a battery container for such as alkali-manganese batteries and nickel cadmium batteries in which strong alkaline solution is packed. The reason why nickel plating is used for batteries such as alkali manganese batteries and nickel cadmium batteries is as follows. Nickel having excellent corrosion resistance to alkali is suitable for these batteries whose electrolyte is chiefly strong alkaline potassium hydroxide. Moreover, nickel is suitable for batteries since nickel has steady contact resistance when the battery is connected with an external terminal. Furthermore, nickel has excellent spot welding properties in case where each component is spot welded when assembled into a battery in the battery manufacturing process.

By the way, recently the main current of the plating method has been pre-plating, in which a steel strip is nickeled beforehand, replacing past barrel plating. It was difficult to manufacture products of high quality steadily by the past barrel plating because the difference of the plating thickness was large and it was especially difficult to nickel inside the container uniformly. As for pre-plating, the method of giving thermal diffusion processing after nickel plating has come to be applied chiefly to improve corrosion resistance. Now, the relation between the battery performance of the alkali manganese battery and the positive electrode container (battery container) is described hereafter. The said battery performance and the properties of the inside of positive electrode container are closely related. It is said that the lower the contact resistance between the inside of the positive electrode container and the positive electrode mix of the alkali manganese battery (consisting of manganese dioxide as a positive electrode active material, graphite as a conductor, and potassium hydroxide as electrolyte), the more excellent the battery performance. As for alkali manganese battery, the positive electrode mix and the positive electrode container are in contact, and the positive electrode container serves as not only a container of the battery but also as a conductor which transfers electrons.

Therefore, when the contact resistance between the positive electrode mix and the inner surface of the positive electrode container is great, the internal resistance of the battery rises. It causes decrease in the operation voltage and in the electrical discharge duration, obstructing the battery performance. So, it is desirable to decrease the contact resistance between the positive electrode mix and the inner surface of the positive electrode container. Therefore, roughing the surface inner surface the positive electrode container, making a ditch on the positive electrode container in the vertical direction, and applying conductive coating or a conducting material made by adding binder to graphite are proposed to decrease the contact resistance between the positive electrode mix and the inner surface of the positive electrode container.

Next, the press-forming method of the battery container is described. Recently, DI (drawing and ironing) forming method is increasingly used as a method of thinning wall to increase the capacity of the battery replacing the past multi step deep drawing method (see Published Japanese Patent Hei 7-99686). This DI forming method and DTR (drawing thin and redraw) forming method is capable of increasing the battery capacity because the container side wall being thinner than the bottom thickness allows more positive electrode and negative electrode active materials to be contained. Moreover, the thick bottom has an advantage to improve the pressure resistance of the battery.

OBJECTIVE OF THE PRESENT INVENTION

By the way, although the DI forming method and the DTR forming method are effective for increasing battery capacity as mentioned above, there is a disadvantage when they are used for continuous forming because the deformation resistance of the material in those methods is greater than in the conventional multi step deep-drawing forming method. Concretely, when the powdering quality (powdery dropout of the plating layer) in the cupping process of the DI forming method and the DTR forming method is inferior, the powder adheres to the die and the punch in the ironing process causing a defect in the container side wall. Although the similar phenomenon happens in the deep-drawing forming, the above-mentioned defect is more remarkable in the DI forming method and the DTR forming method because the container wall has small surface roughness, which produced more lustrous appearance. Moreover, powdering quality is more critical in the DI forming method and the DTR forming method. Also, because the contact pressure of the material and the tool is greater in the DI forming method and the DTR forming method than that in the drawing method, favorable lubrication is requested for tool life. Therefore, materials which have a favorable powdering quality and retention of the press lubricant are requested.

When using nickel plated steel sheet, one of the ways to improve the retention of the lubricant is to cause cracks in the plating layer at the press-forming step and to hold the lubricant in the part where cracks are caused. As a means for this, gloss nickel plating producing a hard plating layer is generally brought to mind. However, although the gloss nickel plating produces a hard gloss plating layer, it is brittle and it has inferior powdering quality at the press-forming. In addition, since gloss plating involves organic additives containing sulfur (for example, sulfomic acid having=C—$SO_2$-group) to make electrolytically deposited crystal grains fine, sulfur is absorbed in the plating layer, which causes the embrittlement with sulfur promoted by the temperature rise of the material in the ironing and the stretching process of the DI forming and the DTR forming resulting in a deteriorated powdering quality.

The inventor of the present invention examined various materials for a battery container having excellent formability in the DI forming method and the DTR forming method from such viewpoints, and found that nickel-cobalt alloy plating is suitable.

The present invention is based on such findings and it is aimed at a battery container having high quality and excellent continuous formability and a surface treated steel sheet which is suitable for producing the said battery container. Another objective of the present invention is to improve the removability of container (strippability) after the DI forming and the DTR forming. This is taken into consideration since the difficulty of stripping the container from the punch (strippability) in the final pressing process is critical in the container manufacturing in addition to the above-mentioned powdering quality. At stripping where the container is pulled out from the punch hitching fingernails on the edge of the container, there was a problem that an inferior stripping caused breaking and split at the open edge portion of the container more frequently, which deteriorated the productivity. (The best manner realizing the present invention) (Embodiment)

First of all, the formation of the nickel-cobalt alloy plating of the above-mentioned battery container and the surface treated steel sheet is described. When using a plating bath in which cobalt sulfate is added to Watts bath or sulfamate bath, eutectoid of cobalt and nickel is formed. As a result, with the increase of cobalt content in the plating layer, the hardness of the eutectoid plating layer increases. Concretely, the surface hardness of the plating by the nickel sulfamate bath rises to about 300 to 320 (Vickers hardness) when cobalt is added by 1 g/l (cobalt content 5%), while it is about 220 to 230 (Vickers hardness) when cobalt is not added.

Similarly, the hardness of the plating layer of the nickel-iron alloy plating reaches about 500 (Vickers hardness) when containing iron by 3 to 5% in the nickel plating layer. Thus, the surface treated steel sheet having hardened plating layer was manufactured, and then this surface treated steel sheet was formed into a battery container (alkali manganese battery LR6 type) using the DI forming method and the DTR forming method, etc. And when the side wall inside and outside of the battery container was observed with a microscope, a fine surface roughening was observed.

In order to examine the powdering quality, the lubricant inside and outside of the manufactured battery container was removed with an organic solvent and then the powder dropped out from the plating layer was adhered to the adhesive tape and the amount was observed with the magnifying glass (magnification 25 times). As a result, remarkable decrease in the powdering quality was observed.

In order to evaluate the continuous formability of the battery container, powdering qualities in three kinds of forming methods, which are the deep-drawing method, the DI forming method, and the DTR forming method, were examined. It was found that nickel-cobalt alloy coated steel sheet and nickel-iron alloy coated steel sheet which constitute the surface treated steel sheet used in the present invention have smaller-punching load compared to the ordinary gloss nickel plated steel sheet.

When the surface treated steel sheet of the present invention is formed, the punching load is small because the lubricant enters the above-mentioned finely rugged surface of the surface treated steel sheet in the cupping process and the friction resistance decreases in the subsequent ironing process of the DI forming and the stretching process of the DTR forming due to the favorable retention of the lubricant between the materials and the die or the punch. It is greatly advantageous that the defects of the die and the punch due to metal-to-metal contact decrease because of the lowered punching load, resulting in longer die life and improved continuous productivity of the battery container. And favorable retention of the lubricant is also advantageous for the removability (strippability) of the battery container which is an important factor in the DI formability and the DTR formability.

The present invention is not only applied in the DI forming method and the DTR forming method as a means to thin the wall of the battery container, but also favorably applicable in the conventional multi step deep-drawing method because it improves the powdering quality and decreases defects.

Moreover, when a battery is produced by forming the plated steel sheet of the present invention into an alkali manganese battery container using the DI forming method or the DTR forming method, the adhesion of the positive electrode mix to the inside of the container, and the adhesion of the graphite coating coated inside the battery container to the positive electrode mix after formed into the battery container are improved by the existence of the above-mentioned finely rugged surface. That is, the use of the plated steel sheet of the present invention compensates the drawbacks that the surface roughness inside the container formed using the DI forming method and the DTR forming method is small and that the adhesion of it to the positive electrode mix or the graphite coating is inferior. Since the nickel-based alloy plating containing cobalt and iron of the present invention are involved in the iron-group which has excellent resistance to alkali corrosion and dissolution, it is a suitable material for the batteries such as the alkali manganese batteries, the nickel cadmium batteries, and the nickel hydrogen batteries of which electrolyte is high concentration alkaline solution.

By the way, the suitable cobalt content of the nickel-cobalt alloy plating is from 0.5% to 10%. When the cobalt content is less than 0.5%, it is not effective for hardening the cobalt plating layer. On the other hand, when the cobalt content is exceeding 10%, it is uneconomical because the hardening effect on the surface treated steel sheet is saturated and also because cobalt is expensive precious metal.

As for the nickel-iron alloy plating, the suitable iron content is from 0.5% to 5%. When the iron content is less than 0.5%, hardening effect can not be obtained. On the other hand, when the iron content is exceeding 5%, the hardening effect is saturated, and it also causes difficulty to control the bath when the iron content increases any further. In relation to the plating thickness of the surface treated steel sheet of the present invention, the preferable range for the inside of the container is from 0.5 to 3.0 $\mu$m both for the nickel-cobalt alloy plating and the nickel-iron alloy plating. On the other hand, the preferable range for the outside of it is from 1.0 to 4.0 $\mu$m.

When the plating thickness of inside the container is less than 0.5 $\mu$m, the exposure of the steel substrate is increased and the corrosion resistance is inferior in the container of batteries such as alkali manganese battery, causing deterioration in the battery performance due to dissolving out of the ferrous ion into the electrolyte. On the other hand, when the plating thickness outside the container is less than 1.0 $\mu$m, rust might be generated on the battery container during press forming process and the battery manufacturing process and while preserving it for a long period of time since it does not have enough corrosion resistance.

The upper limits of the plating thicknesses inside and outside of the container are 0.3 $\mu$m and 0.4 $\mu$m, respectively, because the effect is saturated when the plating thickness exceeds these values and also it is uneconomical to make them any thicker.

Usually a low carbon aluminum killed steel is suitably used a base material of a surface treated steel sheet.

In addition, cold-rolled steel strip prepared from non-aging hyper low carbon steel (carbon content is less than 0.01%) with niobium and/or titanium added is also used.

And the steel strip subjected Electro-cleaning, annealing, and temper rolling after cold-rolling using a conventional method is used as a substrate for plating. After that a surface treated steel sheet is manufactured by plating the steel substrate with nickel-cobalt alloy or nickel-iron alloy.

As for the plating bath, however both of the known sulphate bath and the sulfamate bath can be used, sulfamate bath is suitable since it is comparatively easy to be controlled. Since either ratio of cobalt or iron to nickel deposited into plating layer is several times greater than that of concentration in either plating bath, it is possible to use nickel anode for anode and to supply cobalt and ferrous ions in the form of sulfamate or sulfate.

EXAMPLE

The present invention is explained more concretely referring to the following examples.

Low carbon aluminum killed steel sheets subjected to cold-rolling, annealing, and temper rolling having the thickness of 0.25 mm and 0.4 mm were used as the substrates for plating. The chemical compositions of both steel substrates were as follows. C:0.04% (% means percent by weight, same for the following), Mn:0.22%, Si:0.01%, P:0.012%, S:0.006%, Al:0.048%, N:0.0025%.

After subjected to the ordinary pretreatment comprising alkali electrolytical degreasing, rinsing, acid sulfuric dipping into and subsequent rinsing, the above-mentioned steel substrates were plated with nickel-cobalt alloy and nickel-iron alloy on the following conditions and made into surface treated steel sheets.

1) Nickel-cobalt alloy plating:

Various quantity of cobalt sulfate were added to nickel sulfamate bath to have the nickel plating layer contain cobalt.

Bath composition:

| nickel sulfamate | $Ni(NH_2SO_3)_2 \cdot 4H_2O$ | 600 g/l |
| --- | --- | --- |
| nickel chloride | $NiCl_2 \cdot 6H_2O$ | 10 g/l |
| cobalt sulfate | $CoSO_4 \cdot 6H_2O$ | 5–20 g/l |
| boric acid | $H_3BO_3$ | 40 g/l |
| citric acid | | 0.6 g/l |
| saccharin | | 0.5 g/l |

Bath pH=4 (adjusted with addition of the sulfamic acid), stirring: air stirred. Bath temperature 60° C. Cathode current density 10 A/dm$^2$. Anode=A titanium basket packed with S pellet (brand name made by the INCO company, spheroidal) and covered with a bag made of polypropylene was used as anode. The cobalt content and the thickness of the plating film were varied by changing the amount of adding cobalt sulfate and the electrolysis duration on the above-mentioned conditions.

2) Nickel-iron alloy plating:

Iron sulfamate was added to the nickel sulfamate bath to have the nickel plating layer contain iron.

Bath composition:

| nickel sulfamate | $Ni(NH_2SO_3)_2 \cdot 4H_2O$ | 450 g/l |
| --- | --- | --- |
| iron sulfamate | $Fe(NH_2SO_3)_2 \cdot 5H_2O$ | 0–7 g/l |
| boric acid | $H_3BO_3$ | 45 g/l |
| citric acid | | 0.6 g/l |
| saccharin | | 0.5 g/l |

Bath temperature=50° C., Cathode current density=10 A/dm$^2$,

Anode:

A titanium basket packed with S pellet (brand name made by the INCO company, spheroidal) and covered with a bag made of polypropylene was used.

The amount of iron content and the thickness of the plating film were varied by changing the amount of adding iron sulfamate and the electrolysis duration on the above-mentioned conditions. After the above-mentioned nickel-cobalt alloy plating and the nickel-iron alloy plating were done, the plating layer was dissolved to 3% nitric acid and the plating thickness and the alloy composition of the plating film were analyzed with ICP (inductively coupled plasma atomic emission spectrochemical analysis) method.

The plating thickness ($\mu$m) was determined by dividing the dissolved amount value of each element with the value of the plated area and considering the specific gravity of each element. Table 1 shows those results.

(Battery container manufacturing)

As for the battery container formed by the DI forming method, the above-mentioned plated steel sheet having the thickness of 0.4 mm was punched out into a blank 41 mm in diameter, drawn into a cup 20.5 mm in diameter, and then formed into 13.8 mm in outside diameter, 0.20 mm in container wall thickness and 56 mm in height by redrawing and two-step ironing using DI forming machine. Finally, the upper part was trimmed off to shape a LR6 type battery container 49.3 mm in height. On the other hand, as for the battery container formed by the DTR forming method, the plated steel sheet 0.25 mm in sheet thickness was punched out into a blank 58 mm in diameter, and then shaped into a LR type battery container 13.8 mm in outside diameter, 0.20 mm in container wall thickness and 49.3 mm in height by several times of drawing and redrawing.

(Evaluation of the powdering quality)

The powdering quality was evaluated by the decrease in weight after forming in the manufacturing process of the above-mentioned battery container. The process was comprising blanking→cupping→degreasing→weight measurement (1)→forming→degreasing→weight measurement (2). Degreasing was conducted by alkali dipping degreasing followed by ultrasonic cleaning in acetone.

Since the error might be large if the weight decrease was measured every one container, 30 of them as one measurement unit were repeated three times. Table 1 shows the result. As is apparent in Table 1, while in the comparative example of 1 to 6, a large number of powders dropout from the containers (from 74 to 160 mg/30 containers), in this present inventions example of 1 to 10, a small number of powders drop-out (from 23 to 33/(30 containers)). This shows that the battery container of the present invention is excellent in powdering.

(Surface hardness of the plating layer)

The surface hardness of the plating layer of the samples obtained in the examples and the comparative examples were measured using the Vickers hardness testing machine (load: 5 g). Table 1 shows the result. As is apparent in Table 1, except comparative example 6 which is plated with gloss nickel, the plating layer surface hardness of both comparative example 1 and 2 are low, while the plating layer surface hardness of the examples of the present invention 1 to 10 is high. This shows that the plating given to the surface treated steel sheet used for the battery container of the present invention has enough surface hardness for a battery container.

(Strippability)

Strippability in the DI forming was measured as follows.

The stripping load required when pulling out the container from the punch by returning the punch after ironing process was measured with a load cell installed in the punch. As shown in Table 1, the stripping load of each example of this invention is less than 50 kg, while those of comparative examples exceed 100 kg. This shows that the stripability of the battery container of the present invention is excellent.

for the inside of it and from 1.0 to 4 μm for the outside of it. So, deterioration in the battery performance due to the ferrous ion solve-out into the electrolyte resulted from corrosion at the exposed portion of the steel substrate can be surely prevented. At the same time, it enables to smoothly

TABLE 1

| | | Sheet thickness (mm) | Outside or Inside | Plating thickness (μm) | Alloy Composition (weight %) | | Forming method of battery container | Powdering quality (mg/30 containers) | Hardness of plating surface (Hv 5 kg) | Strippability (Stripping load) (kg) |
|---|---|---|---|---|---|---|---|---|---|---|
| | | | | | Co | Fe | | | | |
| Example | | | | | | | | | | |
| 1 | Ni—Co alloy plating | 0.40 | Outside Inside | 2.0 2.1 | 5.6 5.0 | — — | DI forming | 26 | 395 | 35 |
| 2 | Ni—Co alloy plating | 0.25 | Outside Inside | 1.1 0.6 | 0.6 0.5 | — — | DTR forming | 23 | 345 | 39 |
| 3 | Ni—Co alloy plating | 0.40 | Outside Inside | 1.2 0.5 | 9.8 9.5 | — — | DI forming | 27 | 390 | 25 |
| 4 | Ni—Co alloy plating | 0.25 | Outside Inside | 3.8 3.0 | 0.7 0.6 | — — | DTR forming | 30 | 340 | 45 |
| 5 | Ni—Co alloy plating | 0.40 | Outside Inside | 3.9 2.9 | 9.6 9.7 | — — | DI forming | 32 | 410 | 24 |
| 6 | Ni—Fe alloy plating | 0.40 | Outside Inside | 1.8 1.9 | — — | 13.0 11.3 | DI forming | 27 | 455 | 30 |
| 7 | Ni—Fe alloy plating | 0.25 | Outside Inside | 1.0 0.6 | — — | 1.2 1.1 | DTR forming | 24 | 405 | 43 |
| 8 | Ni—Fe alloy plating | 0.40 | Outside Inside | 1.2 0.6 | — — | 28.9 27.5 | DI forming | 28 | 490 | 25 |
| 9 | Ni—Fe alloy plating | 0.25 | Outside Inside | 3.8 2.9 | — — | 1.3 1.1 | DTR forming | 23 | 410 | 46 |
| 10 | Ni—Fe alloy plating | 0.40 | Outside Inside | 3.6 2.8 | — — | 29.2 29.8 | DI forming | 33 | 480 | 28 |
| Comparative Example | | | | | | | | | | |
| 1 | Dull Ni plating | 0.40 | Outside Inside | 2.1 2.0 | — — | — — | DI forming | 115 | 220 | 115 |
| 2 | Gloss Ni plating | 0.40 | Outside Inside | 1.8 1.9 | — — | — — | DI forming | 160 | 490 | 118 |

(Effect of the invention)

The battery container as claimed in claim 1 is obtained by forming surface treated steel sheet, which is made by plating inside and outside the substrate of steel sheet with nickel-cobalt alloy, using DI forming method or DTR forming method. Since the powdering is remarkably decreased in the nickel-cobalt alloy plating, the punching load can be lowered in the cupping process. Therefore, generation of defects of the die and the punch due to metal-to metal contact is reduced, resulting in longer die life and improved continuous productivity of the battery container. Moreover, favorable retention of the lubricant improves the removability of the battery container (strippability) which is an important factor in the DI formability and the DTR form-ability.

The cobalt content contained in the nickel-cobalt alloy plating of the battery container as claimed in claim 2 is from 0.5 to 10 percent by weight. This enables to fully harden the nickel-cobalt alloy plating inside and outside of the battery container while considering the economy.

The thickness of the nickel-cobalt alloy plating of the battery container as claimed in claim 3 is from 0.5 to 3 μm conduct the press working of the battery container and to surely prevent the rust generation while preserving the container for a long period of time.

The battery container is obtained by forming the surface treated steel sheet, which is prepared by plating inside and outside of the steel substrate with nickel-iron alloy, using the DI forming method or the DTR forming method. Since powdering can be remarkably decreased in the nickel-iron alloy plating as well as in the nickel-cobalt alloy plating, the punch load can be lowered in the cupping process. This enables to reduce the generation of defects of the die and the punch due to metal-to metal contact, resulting in longer die life and improved continuous productivity of the battery container. Moreover, favorable retention of the lubricant improves removability of the battery container (strippability) which is an important factor in the DI formability and the DTR formability.

The iron content of the nickel-iron alloy plating of the battery container is from 0.5 to 5 percent by weight. This enables to fully harden the nickel-iron alloy plating inside and outside of the battery container as well as to control the bath steadily while considering the economy.

The thickness of the nickel-iron alloy plating of the battery container is from 0.5 to 3 μm for the inside of the container. On the other hand, it is from 1.0 to 4 μm for the outside of it. As a result, deterioration in the battery performance due to the ferrous ion solve-out into the electrolyte resulted from corrosion at the exposed portion of the steel substrate can be surely prevented. It also enables to smoothly conduct the press working of the battery container and to surely prevent the rust generation while preserving the container for a long period of time.

The surface treated steel sheet is a suitable material for the battery container, since the nickel-cobalt alloy plating is given to the inside and outside of the substrate.

The cobalt content of the nickel-cobalt alloy plating of the surface treated steel sheet is from 0.5 to 10 percent by weight. This surface treated steel sheet enables to fully harden the nickel-cobalt alloy plating inside and outside of the battery container when the it is manufactured into a battery container while considering the economy.

The surface treated steel sheet is a suitable material for the battery container since the nickel-iron alloy plating is given to the inside and outside of the steel substrate.

The iron content of the nickel-iron alloy plating of the surface treated steel sheet is from 0.5 to 5 percent by weight. This surface treated steel sheet enables to fully harden the nickel-iron alloy plating inside and outside of the battery container as well as to control the bath steadily when it is manufactured into a battery container while considering the economy.

What is claimed is:

1. A surface treated steel sheet for a battery container made by plating both inside and outside surfaces of a steel sheet with a nickel-cobalt alloy.

2. The surface treated steel sheet as claimed in claim 1, in which the cobalt content of the said nickel-cobalt alloy plating is from 0.5 to 10 percent by weight.

* * * * *